(12) United States Patent
Wada et al.

(10) Patent No.: US 6,833,213 B2
(45) Date of Patent: Dec. 21, 2004

(54) SEPARATOR FOR A FUEL CELL (75) Inventors: Mikio Wada, Aichi-ken (JP); Toshiyuki Inagaki, Toyota (JP); Yuichi Yagami, Toyota (JP); Tsuyoshi Takahashi, Aichi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 224 days.

(21) Appl. No.: 10/170,472

(22) Filed: Jun. 14, 2002

(65) Prior Publication Data

US 2002/0192522 A1 Dec. 19, 2002

(30) Foreign Application Priority Data

Jun. 14, 2001 (JP) ........................................ 2001-180624
Jun. 6, 2002 (JP) ........................................ 2002-165977

(51) Int. Cl.[7] .............................................. H01M 8/04
(52) U.S. Cl. ........................................ 429/39; 429/34
(58) Field of Search ...................................... 429/34, 39

(56) References Cited

U.S. PATENT DOCUMENTS 6,015,633 A * 1/2000 Carlstrom, Jr. et al. ....... 429/13
6,365,293 B1 * 4/2002 Isono et al. .................... 429/30
6,461,754 B1 * 10/2002 Zeng ............................. 429/26
6,500,579 B1 * 12/2002 Maeda et al. .................. 429/34
6,531,236 B1 * 3/2003 Hatoh et al. .................. 429/34
2002/0192522 A1 * 12/2002 Wada et al. .................. 429/26

FOREIGN PATENT DOCUMENTS

EP          1213780        *  6/2002
JP       2000-228207          8/2000

* cited by examiner

Primary Examiner—Mark Ruthkosky
(74) Attorney, Agent, or Firm—Kenyon & Kenyon

(57) ABSTRACT

A separator for a fuel cell, where the fuel cell has two separators and an MEA sandwiched by the metal separators. The separator has a portion corresponding to the power generating portion of the MEA and opposing portions located on opposite sides of the power generating portion. The separator has a gas passage at a first surface and a coolant passage at a second, opposite surface. The gas passage has an odd number of straight-extending portions and an even number of U-turn portions and extends between the opposing portions by U-turning twice or more. The coolant passage extends straight between the opposing portions without U-turning.

5 Claims, 5 Drawing Sheets

SEPARATOR FOR A FUEL CELL

BACKGROUND OF THE INVENTION

1. Field of the Invention

The present invention relates to a metal separator for a PEFC (Polymer Electrolyte Fuel Cell).

2. Description of Related Art

A PEFC apparatus includes individual fuel cells. Each fuel cell includes a membrane-electrode assembly (MEA) and a separator. The MEA includes an electrolyte membrane and a pair of electrodes disposed on opposite sides of the electrolyte membrane. The pair of electrodes includes an anode provided on one side of the membrane and constructed of a first catalyst layer and a cathode provided on the other side of the membrane and constructed of a second catalyst layer. A first diffusion layer may be provided between the first catalyst layer and a first separator and a second diffusion layer between the second catalyst layer and a second separator. The first separator has a passage formed therein for supplying fuel gas (hydrogen) to the anode and the second separator has a passage formed therein for oxidant gas (oxygen, usually, air) to the cathode. A plurality of fuel cells are layered to construct a module. A number of modules are piled, and electrical terminals, electrical insulators, and end plates are disposed at opposite ends of the pile of modules to construct a stack of fuel cells. After tightening the stack of fuel cells between the opposite end plates in a fuel cell stacking direction, the end plates are coupled to a fastening member (for example, a tension plate) extending in a fuel cell stacking direction outside the pile of fuel cells by bolts extending perpendicularly to the fuel cell stacking direction.

In the PEFC, at the anode, hydrogen is changed to positively charged hydrogen ions (i.e., protons) and electrons. The hydrogen ions move through the electrolyte to the cathode where the hydrogen ions react with oxygen supplied and electrons (which are generated at an anode of the adjacent MEA and move to the cathode of the instant MEA through a separator) to form water as follows:

At the anode: 
At the cathode:

To cool the fuel cells, the temperature of which rises due to the heat generated at the water production reaction and a Joulean heat, a cooling water passage is formed at every cell or at every module and a cooling water is caused to flow in the cooling water passage.

In a case where a length of the reactant gas passage is short, a gas flow speed required for causing a necessary amount of gas to flow over a predetermined MEA cross-sectional area is low, so that diffusion of gas to the electrode is slow, resulting in lower fuel cell power output. Further, when the gas speed is low, the product water is unlikely to be conveyed to the outlet of the gas passage by the gas flow, so that the product water is apt to stay in the gas passage to block the gas passage.

In order to make the length of the reactant gas passage long to thereby raise the power of the fuel cell and to suppress retention of the product water, usually the gas passage is constructed serpentine.

Japanese Patent Publication No. 2000-228207 discloses a metal separator having a serpentine gas passage. The separator includes two outside plates and an intermediate plate disposed between the two outside plates. A serpentine gas passage is formed in each outside plate at the outside surface of the outside plate. A cooling water passage is formed between the outside plate and the intermediate plate and is serpentine corresponding to the serpentine structure of the gas passage. Therefore, the cooling water passage is long like the gas passage.

However, with the conventional metal separator, there are the following problems:

First, since the cooling water passage is serpentine and long, the temperature of the cooling water is considerably high near an outlet of the cooling water passage so that cooling of the fuel cell is not effective.

Second, since the cooling water passage is serpentine, the pressure loss at the cooling water passage is large.

Third, if only the gas passage is made serpentine and the cooling water passage is made straight, at an intersection of both passages, the cooling water passage is blocked by a wall of a U-tern portion of the gas passage. Therefore, the cooling water passage cannot be designed straight.

SUMMARY OF THE INVENTION

An object of the present invention is to provide a separator for a fuel cell where a cooling efficiency of the fuel cell is raised, maintaining a good power characteristic.

BRIEF DESCRIPTION OF THE DRAWINGS

The above and other objects, features, and advantages of the present invention will become apparent and will be more readily appreciated from the following detailed description of the preferred embodiments of the present invention in conjunction with the accompanying drawing, in which.

DETAILED DESCRIPTION OF THE PREFERRED EMBODIMENTS

A separator for a fuel cell according to the present invention will be explained with reference to FIGS. 1-8. FIGS. 1-7 illustrate a first embodiment of the present invention, and FIG. 8 illustrates a second embodiment of the present invention. Portions having the same or similar structures over the first and the second embodiments of the present invention are denoted with the same reference numerals over the first and the second embodiments of the present invention.

First, the portions having the same or similar structures over the first and the second embodiments of the present invention will be explained with reference to FIGS. 1-7.

A fuel cell 10 to which a separator according to the present invention is assembled is of a polymer electrolyte fuel cell (hereinafter, PEFC)-type. The fuel cell 10 is mounted to, for example, a vehicle. However, the fuel cell 10 may be used for other than a vehicle.

Figure 1:
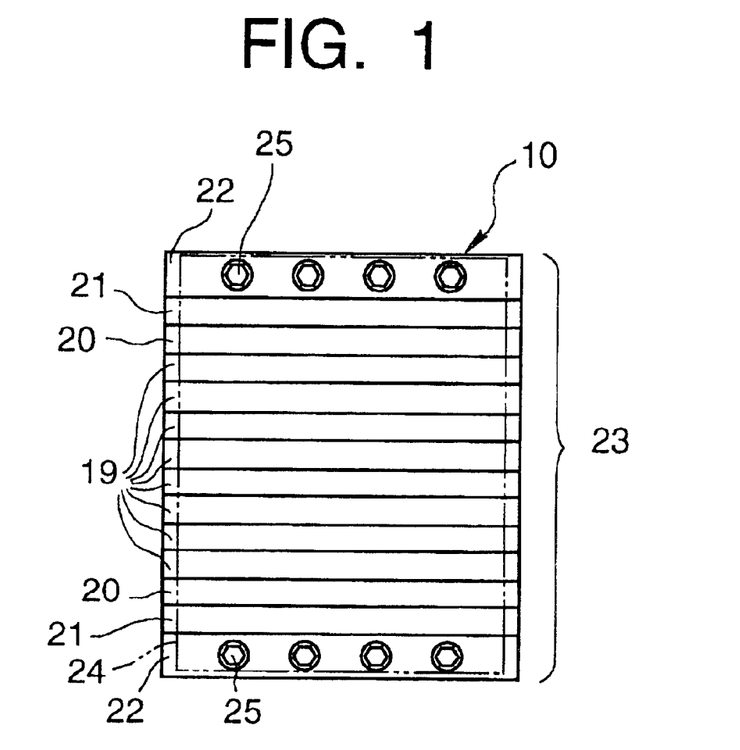
FIG. 1 is an elevational view of a PEFC apparatus provided with a separator for a fuel cell according to the present invention.
Figure 2:
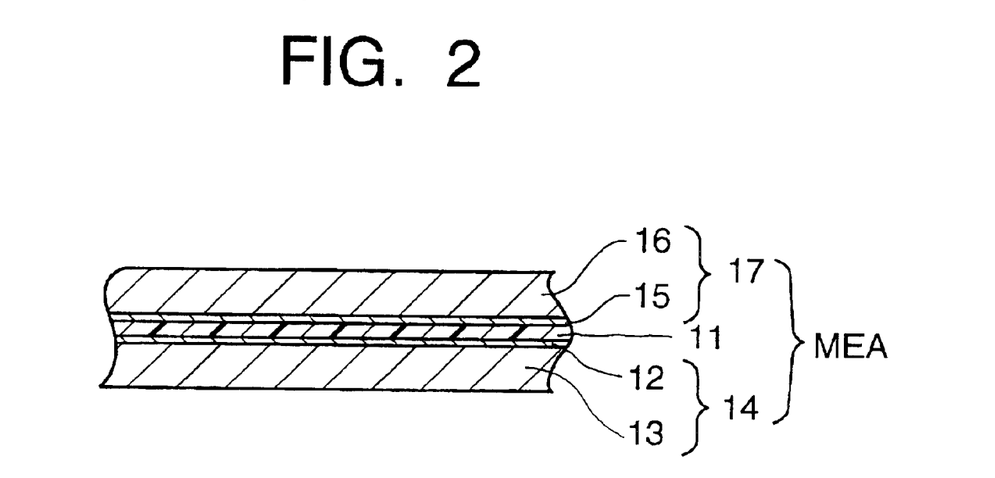
FIG. 2 is a cross-sectional view of an MEA of the fuel cell provided with the separator according to the present invention.
Figure 3:
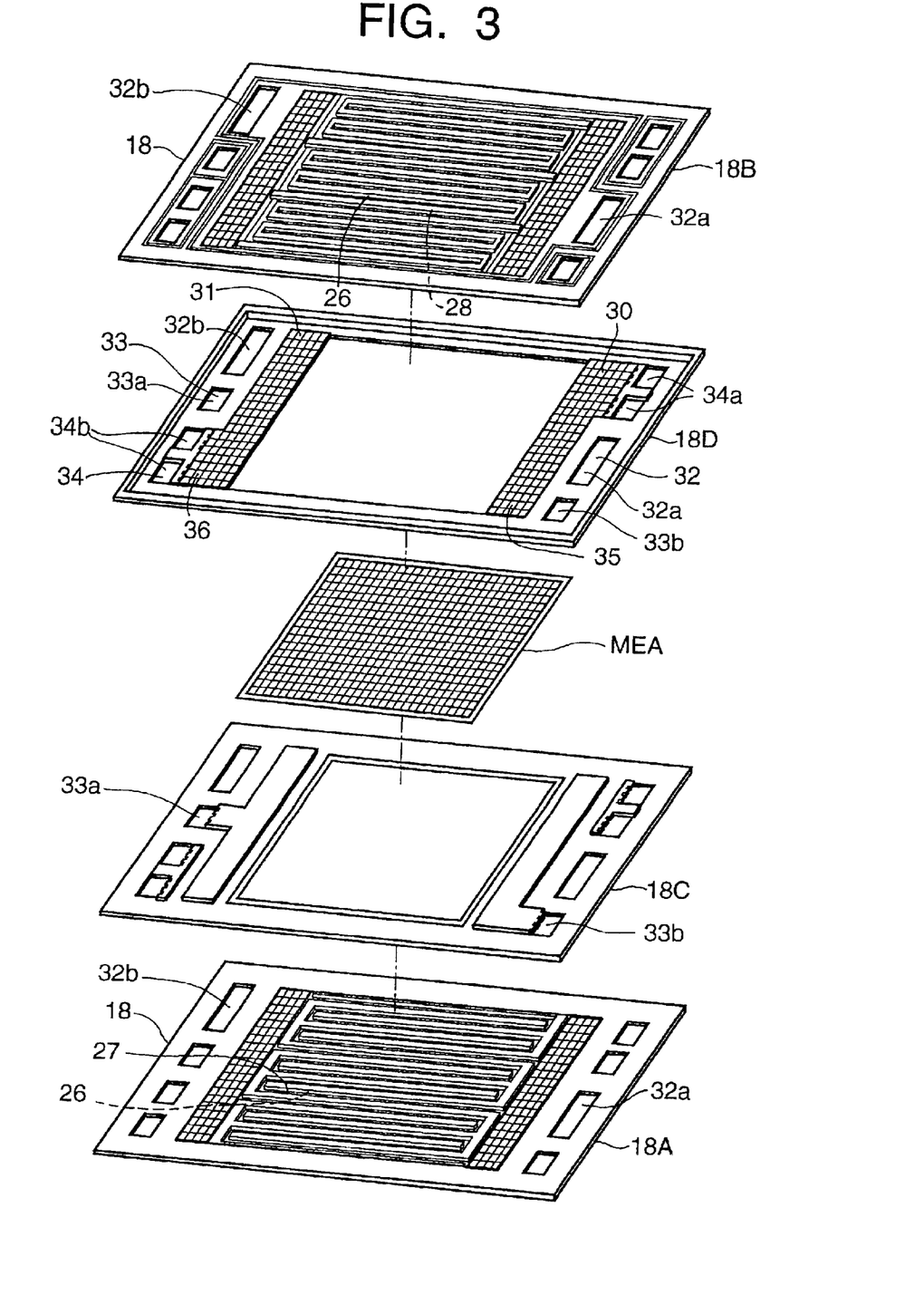
FIG. 3 is a perspective view, shown in a decomposed state, of the fuel cell provided with the separator according to the present invention.
Figure 6:
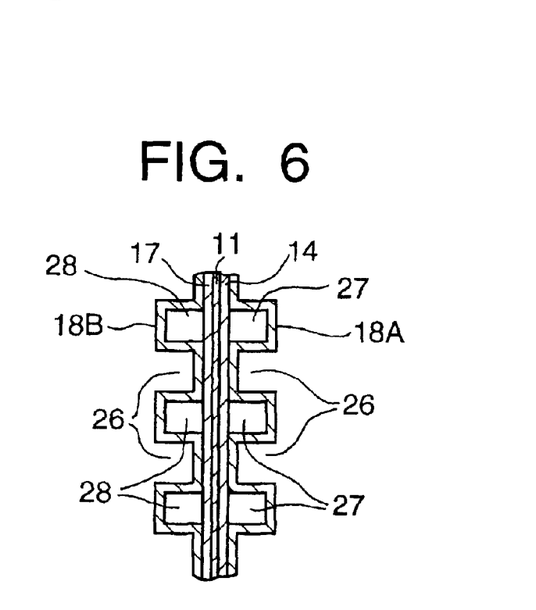
FIG. 6 is a cross-sectional view of the fuel cell provided with the separator according to the present invention illustrating a structural relationship between a fuel gas passage and an oxidant gas passage (corresponding to a cross section along line A—A of FIGS. 5 and 8)

As illustrated in FIGS. 1-3, the PEFC 10 includes a stack of individual fuel cells 23. Each fuel cell includes a membrane-electrode assembly (MEA) and a separator 18. The MEA includes an electrolyte membrane 11 and a pair of electrodes disposed on opposite sides of the membrane 11. The pair of electrodes include (a) an anode 14 provided on one side of the membrane and including a first catalyst layer 12 and (b) a cathode 17 provided on the other side of the membrane and including a second catalyst layer 15. A first diffusion layer 13 may be disposed between the first catalyst layer 12 and a separator 18A provided on an anode side of the MEA, and a second diffusion layer 16 may be disposed between the second catalyst layer 15 and a separator 18B provided on a cathode side of the MEA. The first diffusion layer 13 and the second diffusion layer 16 may be conceived to be a portion of the MEA. As shown in FIG. 6, the separator 18A includes a fuel gas (hydrogen) passage 27 formed at a first, MEA-opposing surface and a coolant (cooling water) passage 26 formed at a second, opposite surface. The separator 18B includes an oxidant gas (oxygen, usually, air) passage 28 formed at a first, MEA-opposing surface and a coolant (cooling water) passage 26 formed at a second, opposite surface. The coolant passage 26 is provided at every fuel cell or at every module. Referring again to FIG. 1, at least one fuel cell constructs a module 19, and a number of modules are piled, and electrical terminals 20, electrical insulators 21, and end plates 22 are disposed at opposite ends of the pile of modules to construct the stack of fuel cells 23. After tightening the stack of fuel cells 23 between the end plates 22 in a fuel cell stacking direction, the end plates 22 are coupled to the fastening member 24 (for example, a tension plate) extending in the fuel stacking direction outside the pile of fuel cells by bolts 25 or nuts.

As shown in FIG. 3, the separator 18 of the fuel cell includes metal separators 18A and 18B and synthetic resin frames 18C and 18D. The synthetic resin frames 18C and 18D have a hole (perforated portion) at a central portion thereof.

When the MEA and the separator 18 are layered, the synthetic resin frame 18C is disposed between the metal separator 18A and the MEA, and the synthetic resin frame 18D is disposed between the metal separator 18B and the MEA. As a result, at a portion of the synthetic resin frames 18C and 18D where the frame material is present, the layering order is the order of the metal separator 18A, the synthetic resin frame 18C, the MEA, the synthetic resin frame 18D, and the metal separator B. Since the synthetic resin frames 18C and 18D have a hole at the central portion, at the hole portion of the synthetic resin frames 18C and 18D, the MEA is sandwiched between the metal separators 18A and 18b. The portion of the MEA where the MEA with the diffusion layers on the opposite sides of the MEA is directly sandwiched between the metal separators 18A and 18B constitutes a power generating portion of the fuel cell, and the portion of the separator 18 corresponding to the power generating portion of the fuel cell will be called hereinafter as a power generating portion corresponding portion of separator 18. The separator 18 includes opposing portions 30 and 31 located on opposite sides of the power generating portion corresponding portion.

The catalyst layers 12 and 15 include platinum (Pt), carbon (C), and electrolyte. The diffusion layers 13 and 16 include carbon (C) and have a gas-permeability.

The separators 18A and 18B are made from metal and have no gas-permeability. The metal separators 18A and 18B are constructed of a metal plate (for example, a stainless steel plate) plated with metal having a good electrical conductivity (for example, nickel).

The separator 18 separates fuel gas (for example, hydrogen) and oxidant gas (for example, air), fuel gas and coolant (for example, cooling water), or oxidant gas and coolant, and the metal separators 18A and 18B constitute an electrical current passage through which electrons move from the anode of one fuel cell to the cathode of an adjacent fuel cell.

The metal separator 18A and the synthetic resin frame 18C separate fuel gas and cooling water from each other, and the metal separator 18B and the synthetic resin frame 18D separate oxidant gas and cooling water from each other.

At a first MEA opposing surface of the power generating portion corresponding portion of metal separator 18A, a fuel gas passage 27 is formed in the separator, and at a second, opposite surface of the power generating portion corresponding portion of metal separator 18A, a coolant passage (cooling water passage) 26 is formed in the separator. Similarly, at a first MEA opposing surface of the power generating portion corresponding portion of metal separator 18B, an oxidant gas passage (air passage) 28 is formed in the separator, and at a second, opposite surface of the power generating portion corresponding portion of metal separator 18B, a coolant passage (cooling water passage) 26 is formed in the separator. The convex and concave for constructing the gas passages 27 and 28 are formed by stamping the separator.

At least one fuel gas passage 27 is provided in the separator and at least one oxidant gas passage 28 is provided in the separator. The drawings show that a plurality of fuel gas passages 27 are provided in parallel with each other and a plurality of oxidant gas passages are provided in parallel with each other.

Each of the at least one gas passage 27, 28 extends between the opposing portions 30 and 31 by U-turning twice or more and has an odd number of straight-extending portions extending parallel to each other and an even number, equal to the odd number minus one, of U-turn portions.

Figure 5:
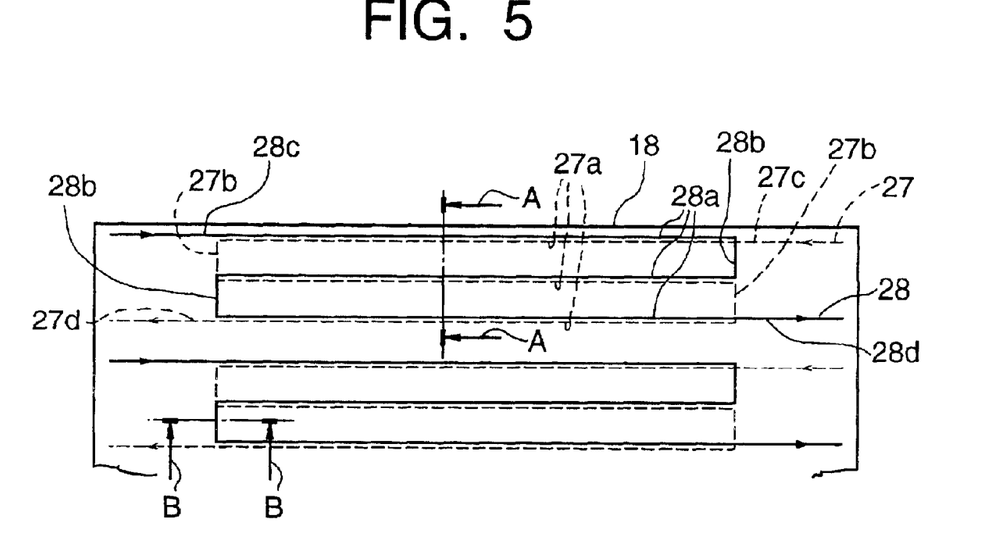
FIG. 5 is a schematic view of a gas passage formed in the separator according to the first embodiment of the invention where a gas passage is shown in a single line.

More particularly, as illustrated in FIG. 5, the fuel gas passage 27 extends between the opposing portions 30 and 31 by U-turning twice or more and has an odd number of straight-extending portions 27a extending parallel to each other and an even number, equal to the odd number minus one, of U-turn portions 27b. Similarly, the oxidant gas passage 28 extends between the opposing portions 30 and 31 by U-turning twice or more and has an odd number of straight-extending portions 28a extending parallel to each other and an even number, equal to the odd number minus one, of U-turn portions 28b.

Figure 7:
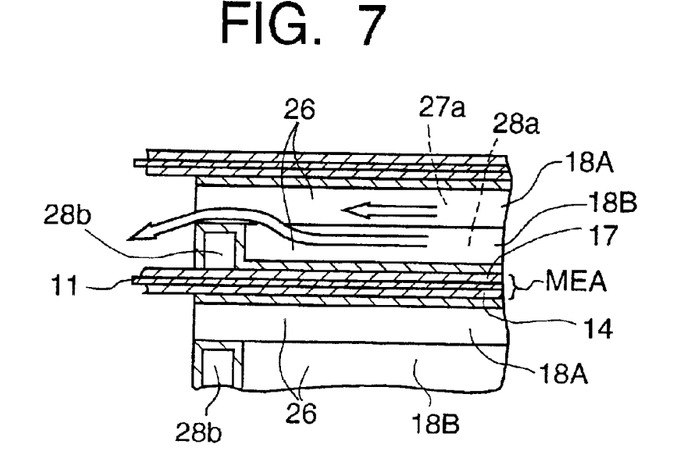
FIG. 7 is a cross-sectional view of the fuel cell provided with the separator according to the present invention illustrating a structural relationship between a coolant passage formed between the fuel gas passages and a coolant passage formed between the oxidant gas passages (corresponding to a cross section along line B—B of FIGS. 5 and 8)
Figure 8:
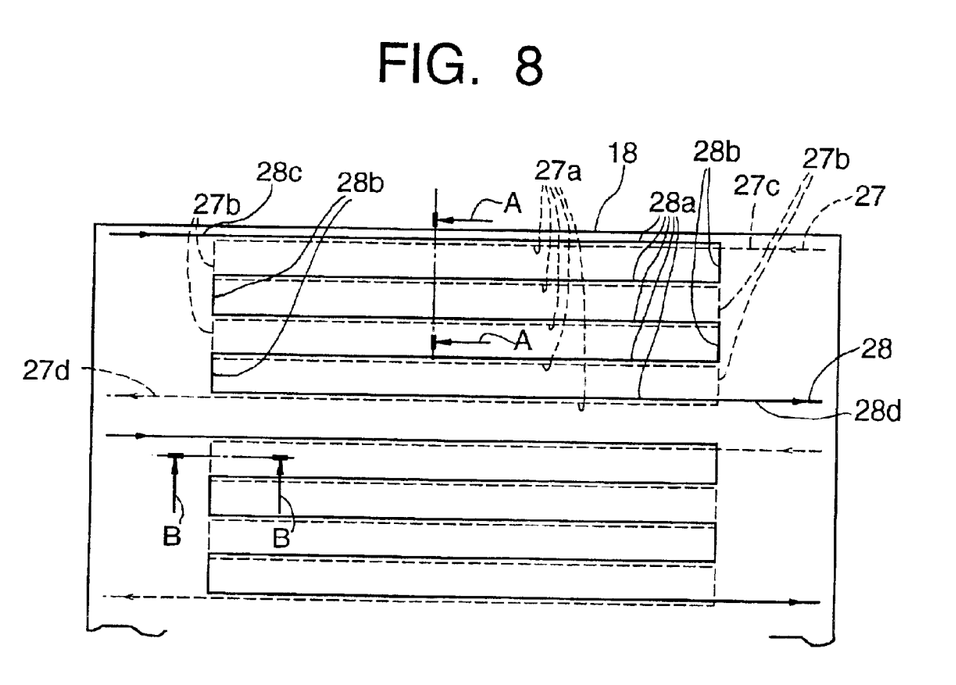
FIG. 8 is a schematic view of a gas passage formed in a separator for a fuel cell according to a second embodiment of the invention where a gas passage is shown in a single line.

FIG. 7 illustrates that the coolant passage (the cooling water passage) 26 formed at the second, opposite surface of the separator extends straight between the opposing portions 30 and 31 without U-turning. The coolant passage 26 has no U-turn portion.

A gas passage formed in one metal separator 18A of the two metal separators 18A and 18B sandwiching the MEA is a fuel gas passage 27 and a gas passage formed in the other metal separator 18B of the two metal separators 18A and 18B sandwiching the MEA is an oxidant gas passage 28.

FIG. 5 illustrates a positional relationship between the fuel gas passage 27 and the oxidant gas passage 28. In FIG. 5, each of the fuel gas passage 27 and the oxidant gas passage 28 is shown in a single line.

As illustrated in FIGS. 5 and 6, the straight-extending portion 27a of the fuel gas passage 27 located on one side of the MEA and the straight-extending portion 28a of the oxidant gas passage 28 located on the other side of the MEA coincide with each other in position and is separated by the MEA.

As illustrated in FIGS. 5 and 7, the U-turn portion 27b of the fuel gas passage 27 and the U-turn portion 28b of the oxidant gas passage 28 which is located on the same side of the power generating portion corresponding portion as the U-turn portion 27b of the fuel gas passage 27 as viewed in a direction connecting the opposing portions 30 and 31 are offset from each other in a direction perpendicular to the straight-extending portions 27a, 28a of the gas passage 27, 28 by one pitch of intervals of the straight-extending portions 27a, 28a of said gas passage 27, 28.

Similarly, the U-turn portion 28b of the oxidant gas passage 28 and the U-turn portion 27b of the fuel gas passage 27 which is located on the same side of the power generating portion corresponding portion as the U-turn portion 28b of the oxidant gas passage 28 as viewed in a direction connecting the opposing portions 30 and 31 are offset from each other in a direction perpendicular to the straight-extending portions 27a, 28a of the gas passage 27, 28 by one pitch of intervals of the straight-extending portions 27a, 28a of the gas passage 27, 28.

Therefore, the coolant passage 26 formed in the separator 18 of the one fuel cell and the coolant passage 26 formed in the separator 18 of the adjacent fuel cell are integral with each other such that where one of the coolant passage 26 of the one fuel cell and the coolant passage 26 of the adjacent fuel cell is blocked by one of the U-turn portions of the gas passage, the other of the coolant passage 26 of the one fuel cell and the coolant passage 26 of the adjacent fuel cell is open to let the coolant flow therethrough.

An inlet 27c to the fuel gas passage 27 formed in the power generating portion corresponding portion of separator 18 and an outlet 27d from the fuel gas passage 27 formed in the power generating portion corresponding portion of separator 18 are located on opposite sides of the power generating portion corresponding portion of separator 18. Similarly, an inlet 28c to the oxidant gas passage 28 formed in the power generating portion corresponding portion of separator 18 and an outlet 28d from the oxidant gas passage 28 formed in the power generating portion corresponding portion of separator 18 are located on opposite sides of the power generating portion corresponding portion of separator 18.

The inlet 27c to the fuel gas passage 27 and the inlet 28c to the oxidant gas passage 28 are located on opposite sides of the power generating portion corresponding portion.

Figure 4:
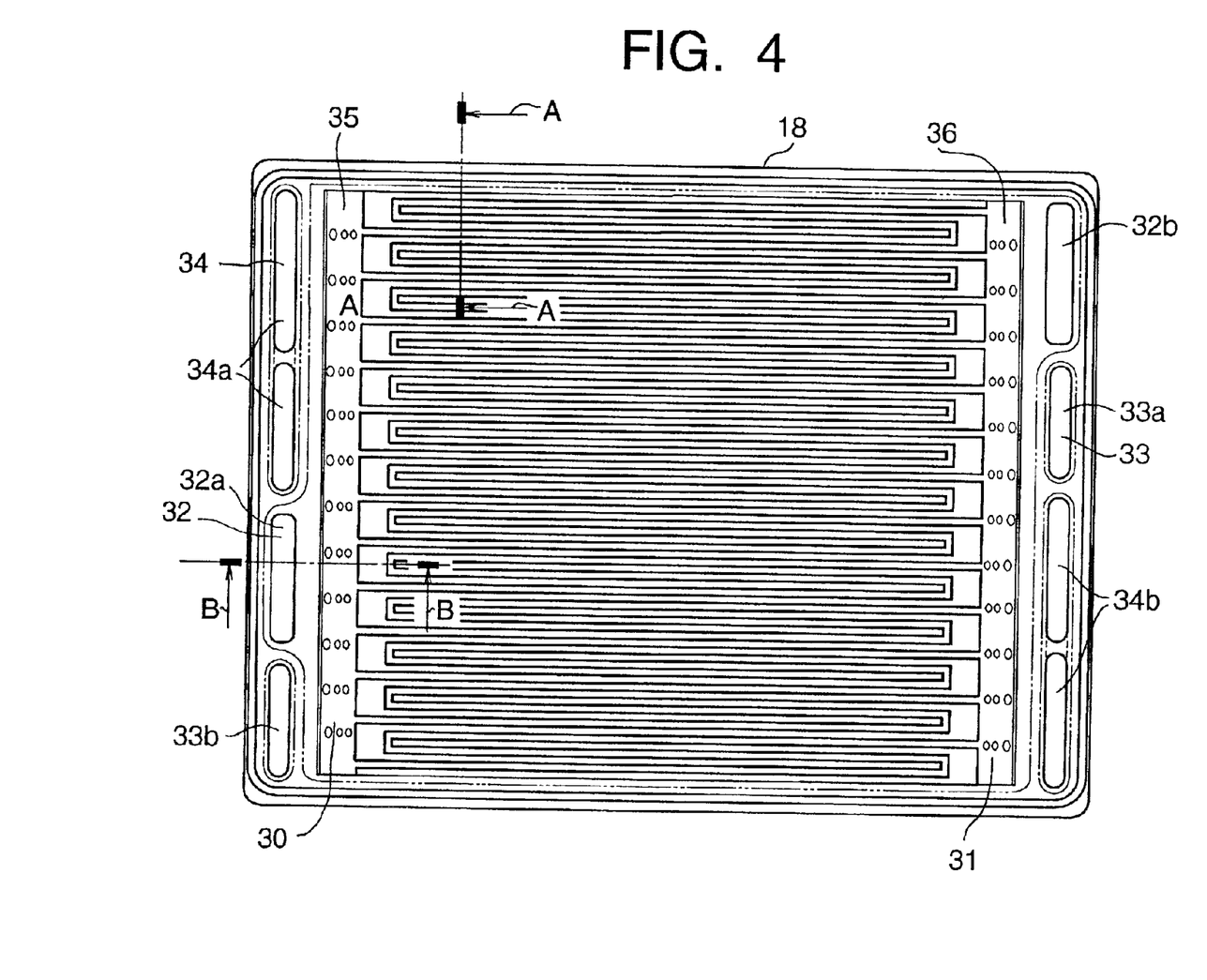
FIG. 4 is a plan view of the separator according to a first embodiment of the present invention.

Referring to FIGS. 3 and 4, in portions of the metal separators 18A and 18B and the synthetic resin frames 18C and 18D corresponding to the opposing portions 30 and 31 located on opposite sides of the power generating portion corresponding portion of separator 18, a coolant manifold 32, a fuel gas manifold 33, and an oxidant gas manifold 34 are formed. In one opposing portion 30, an inlet side coolant manifold 32a, an exit side fuel gas manifold 33b, and an inlet side oxidant gas manifold 34a are formed, and in the other opposing portion 31, an exit side coolant manifold 32b, an inlet side fuel gas manifold 33a, and an exit side oxidant gas manifold 34b are formed.

Between the inlet side gas manifold and the corresponding gas passage formed in the power generating portion corresponding portion, a flow adjusting portion 35 is provided for enlarging the flow pattern from a length of the manifold to an entire width of the power generating portion corresponding portion. Similarly, between the exit side gas manifold and the corresponding gas passage formed in the power generating portion corresponding portion, a flow adjusting portion 36 is provided for shrinking the flow pattern from an entire width of the power generating portion corresponding portion to a length of the manifold. A coolant flow range, a fuel gas flow range, and an oxidant gas flow range are sealed from each other.

Effects due to the above structures common or similar to the first embodiment and the second embodiment of the present invention will be explained.

Since the fuel gas passage 27 and the oxidant gas passage 28 U-turn twice or more between the opposing portions 30 and 31 when they extend between the opposing portions 30 and 31, the length of the gas passages 27 and 28 are longer than those of gas passages of a case where gas passages extend straight without U-turning. As a result, the flow speed of the gas increases in the present invention compared with the case where the gas passage has no U-turn portion, when the same amount of gas is supplied to the MEA. As a result, the power outlet of the fuel cell increases and a product water is unlikely to stay in the gas passage 27, 28. Further, since the coolant passage (cooling water passage) 26 extends straight between the opposing portions 30 and 31 of the separator 18 and has no U-turn portion, the length of the coolant passage is shorter than that of the gas passage 27, 28. As a result, a temperature rise of the coolant is relatively small so that the fuel cell can be cooled efficiently. Further, due to the short length of the coolant passage, a pressure loss in the coolant passage 26 is small.

Since the U-turn portion 27b of the fuel gas passage 27 and the U-turn portion 28b of the oxidant gas passage 28 (which is located on the same side of the power generating portion corresponding portion as the U-turn portion 27b of the fuel gas passage 27 as viewed in a direction connecting the opposing portions 30 and 31) are offset from each other (in a direction perpendicular to the straight-extending portions 27a, 28a of the gas passage 27, 28) by one pitch of intervals of the straight-extending portions 27a, 28a of the gas passage 27, 28, then at a portion where the coolant passage 26 between the straight-extending portions 27a of the fuel gas passage 27 of one fuel cell is intersected and blocked by the U-turn portion 27b of the fuel gas passage 27 of the same fuel cell, the coolant can flow over the blocked portion by flowing in the coolant passage 26 between the straight-extending portions 28a of the oxidant gas passage 28 of an adjacent fuel cell. As a result, the integral coolant passage 26 constructed by the coolant passage 26 between the straight-extending portions 27a of the fuel gas passage 27 of the one fuel cell and the coolant passage 26 between the straight-extending portions 28a of the oxidant gas passage 28 of the adjacent fuel cell is not entirely blocked by the U-turn portion 27b of the fuel gas passage 27.

Similarly, since the U-turn portion 28b of the oxidant gas passage 28 and the U-turn portion 27b of the fuel gas passage 27 (which is located on the same side of the power generating portion corresponding portion as the U-turn portion 28b of the oxidant gas passage 28 as viewed in a direction connecting the opposing portions 30 and 31) are offset from each other (in a direction perpendicular to the straight-extending portions 27a, 28a of the gas passage 27, 28) by one pitch of intervals of the straight-extending portions 27a, 28a of the gas passage 27, 28, then at a portion where the coolant passage 26 between the straight-extending portions 28a of the oxidant gas passage 28 of one fuel cell is intersected and blocked by the U-turn portion 28b of the oxidant gas passage 28 of the same fuel cell, the coolant can flow over the blocked portion by flowing in the coolant passage 26 between the straight-extending portions 27a of the fuel gas passage 27 of an adjacent fuel cell. As a result, the integral coolant passage 26 constructed by the coolant passage 26 between the straight-extending portions 28a of the oxidant gas passage 28 of the one fuel cell and the coolant passage 26 between the straight-extending portions 27a of the fuel gas passage 27 of the adjacent fuel cell is not entirely blocked by the U-turn portion 28b of the oxidant gas passage 28.

Next, portions unique to each embodiment of the present invention will be explained.

In the first embodiment of the present invention, as illustrated in FIGS. 3-7, a plurality of fuel gas passages 27 are formed in the power generating portion corresponding portion the separator 18. Each of the fuel gas passages 27 has three straight-extending portions 27a and two U-turn portions 27b, and is formed in an S-letter pattern. The plurality of fuel gas passages 27 of the S-letter pattern are arranged in the same attitude as each other and connect the opposing portions 30 and 31.

Similarly, a plurality of oxidant gas passages 28 are formed in the power generating portion corresponding portion of separator 18. Each of the oxidant gas passages 28 has three straight-extending portions 28a and two U-turn portions 28b, and is formed in an S-letter pattern. The plurality of oxidant gas passages 28 of the S-letter pattern are arranged in the same attitude as each other and connect the opposing portions 30 and 31.

The coolant passage 26 extends straight between the opposing portions 30 and 31 and has no U-turn portion.

In the second embodiment of the present invention, as illustrated in FIG. 8, a plurality of fuel gas passages 27 are formed in the power generating portion corresponding portion of separator 18. Each of the fuel gas passages 27 has five or more straight-extending portions 27a and four or more U-turn portions 27b, and is formed serpentine. The plurality of fuel gas passages 27 are arranged in the same attitude as each other and connect the opposing portions 30 and 31.

Similarly, a plurality of oxidant gas passages 28 are formed in the power generating portion corresponding portion of separator 18. Each of the oxidant gas passages 28 has five or more straight-extending portions 28a and four or more U-turn portions 28b, and is formed serpentine. The plurality of oxidant gas passages 28 are arranged in the same attitude as each other and connect the opposing portions 30 and 31.

The coolant passage 26 extends straight between the opposing portions 30 and 31 and has no U-turn portion.

According to the present invention, the following technical advantages are obtained:

First, since the gas passage of the separator extends between opposing portions of the separator by U-turning twice or more, a length of the gas passage is longer than that of a gas passage having no u-turn portion. As a result, the gas flow speed increases, the power of the fuel cell increases, and the product water is unlikely to stay in the gas passage. Further, since the coolant passage extends straight between the opposing portions and has no U-turn portion, a temperature rise of the coolant is small so that the fuel cell is efficiently cooled. Further, a pressure loss at the coolant passage is small.

Second, in the case where the U-turn portion of the fuel gas passage and U-turn portion of the oxidant gas passage located on the same side of the power generating portion corresponding portion as the U-turn portion of the fuel gas passage is offset from each other by one pitch of intervals of the straight-extending portions of the gas passage in the direction perpendicular to the straight-extending portions of the gas passage, then at a portion where the coolant gas passage between the straight-extending portions of the fuel gas passage is intersected by the U-turn portion of the fuel gas passage, the coolant can flow in the coolant passage between the straight-extending portions of the oxidant gas passage of the separator of the adjacent fuel cell. As a result, the integral coolant passage of the coolant passage between the straight-extending portions of the fuel gas passage and the coolant passage between the straight-extending portions of the oxidant gas passage of the adjacent fuel cell is not entirely blocked by the U-turn portion of the fuel gas passage. The gas passage does not become narrow.

Similarly, in the case where the U-turn portion of the oxidant gas passage and U-turn portion of the fuel gas passage located on the same side of the power generating portion corresponding portion as the U-turn portion of the oxidant gas passage is offset from each other by one pitch of intervals of the straight-extending portions of the gas passage in the direction perpendicular to the straight-extending portions of the gas passage, then at a portion where the coolant gas passage between the straight-extending portions of the oxidant gas passage is intersected by the U-turn portion of the oxidant gas passage, the coolant can flow in the coolant passage between the straight-extending portions of the fuel gas passage of the separator of the adjacent fuel cell. As a result, the integral coolant passage of the coolant passage between the straight-extending portions of the oxidant gas passage and the coolant passage between the straight-extending portions of the fuel gas passage of the adjacent fuel cell is not entirely blocked by the U-turn portion of the oxidant gas passage. The gas passage does not become narrow.

Although the present invention has been described with reference to specific exemplary embodiments, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. A separator for a polymer electrolyte fuel cell, said separator comprising:

at least one gas passage formed at a first, membrane-electrode assembly opposing surface of said separator within a portion corresponding to a power generating portion of said fuel cell, each of said at least one gas passage extending between opposing portions of said separator located on opposite sides of said power generating portion corresponding portion by U-turning twice or more and having an odd number of straight-extending portions extending parallel to each other and an even number, equal to said odd number minus one, of U-turn portions; and a coolant passage formed at a second, opposite surface of said separator, said coolant passage extending straight between said opposing portions without U-turning;

wherein said at least one gas passage formed in said separator is one of a fuel gas passage and an oxidant gas passage, wherein a straight-extending portion of said at least one gas passage and a straight-extending portion of a second ass passage on a second separator coincide with each other, wherein a U-turn portion of said at least one gas passage and a U-turn portion of said second ass passage which are located adjacent to a first one of said opposing portions are offset from each other in a direction perpendicular to said straight-extending portions of said at least one gas passage by one pitch of interval of said straight-extending portions of said at least one gas passage, and wherein a U-turn portion of said second gas passage and a U-turn portion of said at least one gas passage which are located adjacent to a second one of said opposing portions are offset from each other in a direction perpendicular to said straight-extending portions of said at least one gas passage by one pitch of interval of said straight-extending portions of said at least one gas passage.

2. A separator for a fuel cell according to claim 1, wherein an inlet to said at least one gas passage and an outlet from said at least one gas passage are located on opposite sides of said power generating portion corresponding portion of said separator, and an inlet to said second gas passage and an outlet from said second gas passage are located on opposite sides of said power generating portion corresponding portion of said separator, and wherein said inlet to said at least one gas passage and said inlet to said second gas passage are located on opposite sides of said power generating portion corresponding portion of said separator.

3. A separator for a fuel cell according to claim 1, wherein said coolant passage formed in said separator of said first fuel cell and said coolant passage formed in said separator of said adjacent fuel cell are integral with each other such that where one of said coolant passage of said first fuel cell and said coolant passage of said adjacent fuel cell is blocked by one of said U-turn portions of said first gas passage and second gas passage, the other of said coolant passage of said first fuel cell and said coolant passage of said adjacent fuel cell is open to let a coolant flow therethrough.

4. A separator for a fuel cell according to claim 1, wherein said at least one gas passage each includes two U-turn portions and three straight-extending portions.

5. A separator for a fuel cell according to claim 1, wherein said at least one gas passage each includes four or more U-turn portions and five or more straight-extending portions.

* * * * *